(12) United States Patent
Bouesnard et al.

(10) Patent No.: US 7,429,405 B2
(45) Date of Patent: Sep. 30, 2008

(54) METHOD OF FORMING A COATING FILM

(75) Inventors: Olivier Bouesnard, Jumet (BE);
Georges Pilloy, Jumet (BE);
Jean-Pierre Poels, Jumet (BE)

(73) Assignee: AGC Flat Glass Europe SA, Watermael-Boitsfort (BE)

( * ) Notice: Subject to any disclaimer, the term of this patent is extended or adjusted under 35 U.S.C. 154(b) by 252 days.

(21) Appl. No.: 10/509,176

(22) PCT Filed: Mar. 24, 2003

(86) PCT No.: PCT/EP03/03169

§ 371 (c)(1),
(2), (4) Date: Sep. 27, 2004

(87) PCT Pub. No.: WO03/080529

PCT Pub. Date: Oct. 2, 2003

(65) Prior Publication Data

US 2005/0163926 A1    Jul. 28, 2005

(30) Foreign Application Priority Data

Mar. 25, 2002  (EP) ................................. 02076133

(51) Int. Cl.
*B05D 1/32* (2006.01)

(52) U.S. Cl. ............... 427/282; 427/287; 427/294; 427/255.11; 427/255.395

(58) Field of Classification Search ............... 427/282, 427/287, 294, 255.11, 255.395
See application file for complete search history.

(56) References Cited

U.S. PATENT DOCUMENTS

| 2,559,969 | A | * | 7/1951 | Kennedy | ................ | 427/108 |
| 3,932,681 | A | * | 1/1976 | Forker et al. | .............. | 427/282 |
| 4,224,011 | A | * | 9/1980 | Dodd et al. | ................ | 416/97 R |
| 4,477,486 | A | * | 10/1984 | Boaz | ....................... | 427/510 |
| 5,492,750 | A |   | 2/1996 | Shumaker, Jr. et al. | | |
| 5,713,986 | A |   | 2/1998 | Franz et al. | | |
| 6,521,541 | B2 | * | 2/2003 | Rossi | ....................... | 438/710 |

FOREIGN PATENT DOCUMENTS

GB    928276    6/1963

\* cited by examiner

*Primary Examiner*—Frederick J Parker
(74) *Attorney, Agent, or Firm*—Akerman Senterfitt

(57) ABSTRACT

A method for forming a coating film at part of a surface of a substrate includes, in sequence, a first step of applying a masking agent having inert particles over part of the substrate through a screen having blocked areas, a second step of depositing the coating film under at least partial vacuum over at least part of the surface covered and not covered by the masking agent, and a third step of removing the masking agent covered by the film with the aid of an aqueous fluid.

21 Claims, 1 Drawing Sheet

METHOD OF FORMING A COATING FILM

CROSS-REFERENCE TO RELATED APPLICATIONS

This application is the entry into the U.S. National Stage of International Application No. PCT/EP03/03169 filed 24 Mar. 2003, and claims priority from European Application No. 02076133.4 filed 25 Mar. 2002, the disclosures of both of which are hereby incorporated by reference.

BACKGROUND OF THE INVENTION

The present invention relates to masking part of a substrate's surface to facilitate selectively coating desired portions of the substrate.

Whilst the invention will be described with particular reference to masking portions of glazings or glass sheets it may also be used with other substrates.

In a coated car windscreen, it may be desired to provide a non-coated band around the periphery of the windscreen to reduce the likelihood of corrosion of the coating by ingress of moisture. Such a non-coated band may also provide electrical isolation between the edge of the windscreen and the coating layer if the windscreen's coating layer is electrically heatable and provide a portion at which electrical connectors may be arranged. A non-coated data transmission window may also be provided in the coated glazing, for example for the passage of infra-red or other data signals. Selectively coating desired areas of the glazing may also facilitate incorporation of heating systems, antennas and sensors.

U.S. Pat. No. 5,492,750 describes the use of reusable rigid, metal masks positioned over a glass substrate prior to depositing a coating layer so as to provide non-coated portions. Such masks are inconvenient to manipulate, require regular cleaning and are prone to produce an undesirable ghosting effect rather than a clean demarcation between coated and non-coated portions. A separate set of masks comprising a number of individual masks for each pattern of coating to be deposited is required for industrial production.

U.S. Pat. No. 5,713,986 describes the use of a water soluble resist material which is applied in a predetermined pattern over a substrate prior to the deposition of a coating layer. This resist material and the overlaying material are dissolved away so as to provide non-coated portions. The dissolution of the resist material requires applying water at high temperature which may be costly when used in a large scale process.

The resist material includes substances such as a water soluble film former, a surfactant, a rinsing agent and one or more solvents. The total weight percentage of the film-former, the surfactant and the rinsing agent is generally kept low, thereby providing a resist material which has a substantially low viscosity. When using screen-printing to apply the resist material, it is necessary to add a film thickener to increase the viscosity of the resist material. These film-thickeners may be insoluble in water at high temperature and thus difficult to remove from the substrate. They may react with the resist material and for example may clog the screen used for the printing. They may also have a limited shelf life which requires applying the masking agent within 24 hours after mixing the materials.

All these features cause handling and cost problems when using such a resist material in a large scale process for the manufacture of coated substrates.

SUMMARY OF THE INVENTION

According to one aspect, the present invention provides a method of forming a coating film at part of a surface.

The term inert as used herein means that these particles do not react chemically to any significant extent with the substrate, with the coating film or, preferably, with any other material encountered during the manufacturing process.

The solid particles are preferably inorganic or substantially inorganic and their solubility is preferably low in water. The solid particles may be insoluble or substantially insoluble in water. For example, the inert solid may be an alkaline-earth carbonate, preferably calcium carbonate. Calcium carbonate has the advantage to be a readily available and cheap compound. The inert solid particles may be particles other than metal particles. The particles of the masking agent may be particles other than silicon dioxide particles.

The masking agent may be an enamel. An enamel generally comprises a frit, a medium and perhaps pigments for the colour. Enamels may be applied easily onto the surface of the substrate, for example by screen-printing techniques, and may provide the portion of the substrate free of the coating film with a substantially well-defined pattern.

In the present invention, the enamel preferably does not comprise any pigment. Advantageously, the enamel is colourless or transparent. Any traces of such an enamel that may inadvertently be present on the finished product may be substantially invisible to the naked eye.

The fluid applied to remove the masking agent may be a liquid and preferably comprises water, preferably at least 50% water, more preferably 80% water and most preferably consists of water. Application of the fluid to remove the masking agent may occur by any means, for example, spraying or pouring water, water vapour or steam and is preferably applied at a pressure greater than atmospheric pressure, for example by using one or more pressurised jets of water. The fluid may be applied at room temperature or may be heated. Preferably, the water has a substantially neutral pH; its pH may be of the order of 7.

Application of water or other fluid to remove the masking agent may help to avoid possible damages to the remaining coating film that could occur when using other techniques such as rubbing, brushing and/or any other related means. The masking agent is preferably removed by mechanical action of the water or other fluid; preferably, the masking agent is not dissolved by and does not react chemically with the water or other fluid used to remove it.

According to another aspect, the present invention provides a method of forming a coating film at part of a surface of a substrate.

Glass has the advantage of being an inert and transparent solid whether it is used in the form of microbeads, in the form of ground glass, glass powder or cullet.

The mean number diameter of the glass particles is preferably comprised between 5 and 100 μm, more preferably between 5 and 50 μm.

The expression mean number diameter as herein referred to defines the sum of the diameter of each particle divided by the total number of particles i.e. the mean average particle diameter.

Preferably, at least 45%, 50%, 55%, 60%, 65% or 70% of the glass particles have a diameter that is within −4 μm and +41 μm of the mean number diameter.

According to a further aspect, the present invention provides a method of forming a coating film at part of a surface of a substrate.

A masking agent which comprises a solid phase consisting of particles of which at least 50% of said particles in number have a diameter which is within −4 μm and +4 μm of the mean number diameter may be removed relatively easily from the surface of the substrate. Such a masking agent may comprise particles of which the majority are of similar size; this may result in the masking agent forming a substantially porous layer.

The solid phase is preferably selected from the group consisting of inert solid, solid phase of an enamel, and glass.

The mean diameter of the particles is preferably comprised between 5 and 100 μm, more preferably between 5 and 50 μm, most preferably between 5 and 20 μm, advantageously comprised between 8 and 15 μm.

In particularly advantageous forms of the invention the particle cumulative number size distribution is such that at least 55%, preferably at least 70%, more preferably at least 80% of the particles have a diameter that is within −4 μm and +4 μm of the mean number diameter, preferably within −3 μm and +3 μm of the mean number diameter, more preferably within −2.5 μm and +2.5 μm of the mean diameter.

The masking agent according to the present invention preferably further comprises a substance which facilitates the application of the masking agent at the surface of the substrate in the form of a layer or film or liquid or paste. The substance may be a compound which has a boiling point comprised between 100 and 300° C., preferably comprised between 150° C. and 250° C., for example of 190° C. or 230° C. The substance is advantageously selected from the group consisting of alcohol solvents, aromatic solvents, aliphatic solvents, water and combinations of two or more of these substances. Dipropyleneglycol is, for example, an appropriate substance.

The quantity of the substance present in the masking agent may vary depending on the nature of the solid and the desired viscosity of the masking agent. The quantity of substance, directly before it is applied to the surface of the substrate, may be comprised between 20% and 50% by weight of masking agent, preferably between 25% and 45% by weight, for example 40% by weight.

The solid phase of the masking agent may be obtained by evaporating said substance from the masking agent. The solid phase is preferably free of said substance or substantially free of said substance.

The present invention also provides a method of forming a coating film at part of a surface of a substrate.

Enamels are compounds which commonly acquire a certain hardness and a good adherence to the substrate to which they are applied upon heating at high temperature, for example at an oven temperature comprised between 450° C. and 600° C. They are, for example, applied on glazing such as windscreens in the automotive industry in order to provide a permanent opaque peripheral band around the glazing.

Depositing the coating film under at least partial vacuum enables deposition at a lower temperature than would generally be required if the coating film was to be deposited pyrolitically and may thus avoid, when the masking agent is an enamel, excessive adherence of the enamel to the surface of the substrate thereby facilitating its subsequent removal. Preferably, the enamel is heated at an oven temperature of less than 420° C., more preferably less than 300° C., most preferably less than 200° C.

Advantageously, an enamel comprising at least 50% by weight of frit, for example 60% by weight of frit, is used as masking agent according to the present invention. The frit preferably comprises 50-70% $SiO_2$, 0-36% $B_2O_3$, 0-6% $Li_2O$, 3-10% $Al_2O_3$, 0-6% $ZrO_2$, 1.0-10.0% $Na_2O$, 0-18% $TiO_2$, 0-36% ZnO, 0-2.5 F, 0-20 $K_2O$, 0.4-4% CaO, 0-4.0% $Fe_2O_3$, 0-1% $P_2O_5$, 0-46% $Bi_2O_3$, 0-2% $V_2O_5$, 0-2% $Sb_2O_3$, 0-0.1% $Cr_2O_3$, 0-30% MnO, 0-3% BaO, 0-1% CuO, 0-2.5 SrO, 0-1 MgO, 0-1.6 $La_2O_3$, 0-0.16 AgO, 0-0.5% S and less than 0.1% Pb in percentage by total weight of frit, more preferably 50-70% $SiO_2$, 15-25% $B_2O_3$, 5-10% $Al_2O_3$, 4-6% $ZrO_2$, 2.5-5.0% $Na_2O$, 1-2% $TiO_2$, 1-2% ZnO, 0-1.5 F, 0.7-1.0 $K_2O$, 0.4-0.8% CaO, 0.2-0.5% $Fe_2O_3$, 0-0.25% $P_2O_5$ and less than 0.1% Pb expressed in percentage by total weight of frit.

The enamel may additionally comprise a medium. The medium may be selected from the group consisting of alcohol solvents, aromatic solvents, aliphatic solvents, water and combinations of two or more of these media. For example, dipropyleneglycol is a particularly appropriate medium. The enamel preferably comprises less than 50% by weight of medium, for example 40% by weight of medium.

The enamel preferably does not comprise any pigment.

Additional medium, for example dipropyleneglycol, may be added to the masking agent in its concentrated form before its application over part of a surface of the substrate in order to obtain the desired viscosity, depending on the method of application of the masking agent.

Preferably, at least 55% of the particles of the solid phase of the enamel have a diameter within −4 μm and +4 μm of the mean number diameter of the particles of the solid phase.

The mean diameter of these particles is advantageously comprised between 5 and 50 μm, preferably between 8 and 15 μm.

The viscosity of the masking agent applied over part of the surface of the substrate is preferably comprised between 10,000 and 50,000 mPa.s, more preferably between 15,000 and 45,000 mPa.s, most preferably between 25,000 and 40,000 mPa.s. These ranges of viscosity may facilitate application of the masking agent to the substrate, for example by printing, screen-printing and particularly by silk screen-printing. Alternatively, the viscosity may be comprised between 200 and 50,000, more preferably between 2,000 and 45,000 mPa.s.

The viscosity may be measured on a Brookfield DV II + apparatus with a RV06 needle at a temperature of 23° C. and at a speed of 10 rounds per minute.

The masking agent may be applied over part of the surface of a substrate by hand, by spray, by using a roller, a brush, a pad or by other printing techniques, for example silk-screen printing.

It is preferred to apply the masking agent over part but not the whole surface of the substrate by passing the masking agent through a screen, for example a fine silk, nylon or polyester mesh which has certain areas which are blocked to provide a pattern. This method allows very small portions of the substrate to be covered and a wide variety of patterns to be obtained.

The screen or mesh may comprise between 30 and 150 threads per centimetre, preferably less than 120 threads per centimetre, for example 95 threads per centimetre. This may allow a detailed pattern to be printed whilst avoiding the screen or mesh becoming blocked.

The layer of the masking agent, when applied to the substrate, preferably has a thickness comprised between 5 μm and 100 μm, more preferably between 10 μm and 50 μm, most preferably greater than 20 μm, for example of 25 μm.

This range of thickness may avoid the effect of ghosting when the coating film is deposited over the masking agent. The layer having this range of thickness may be conveniently applied to the substrate by screen printing techniques and may be sufficiently resistant to remain in place during handling of the substrate whilst being adapted to be removed from the substrate when desired.

Once the masking agent has been applied over the substrate, it is preferably dried. The drying may occur at room temperature with or without pulsed air or by heating the substrate with hot pulsed air or with infra-red lamps or in a heating oven, or by a combination of at least two of these variations. The drying preferably occurs at a temperature comprised between 10° C. and 200° C. The masking agent may first be heated at an oven temperature of less than 200° C., preferably at an oven temperature comprised between 150° C. and 190° C., preferably for not more than 10 minutes, more preferably for less than 5 minutes. The drying of the masking agent may enable the evacuation of any volatile substances comprised in the masking agent which could adversely affect the subsequent deposition of the coating film.

The coating film may be a solar control coating film and/or an infra red reflecting coating film and/or a low emissivity coating film and/or an anti-reflective coating film. A solar control film as used herein refers to a coating film which increases the selectivity of the substrate i.e. the ratio of the proportion of incident visible radiation transmitted through the substrate to the proportion of incident solar energy transmitted through the substrate.

The coating film may be transparent or substantially transparent; alternatively it may be opaque.

The coating film may be deposited by a vacuum deposition technique, for example by magnetron sputtering. This is preferably the case when the masking agent is an enamel. Alternatively, the coating film may be pyrolytically formed, for example by chemical vapour deposition or formed in some other way. The coating film is preferably applied over the entire surface of the substrate.

After the coating film has been deposited on the substrate, preferably immediately after, the adherence to the substrate of the masking agent which is covered with the coating film may be tested on samples by using the abrasion test described in standard ISO/DIS 3537 paragraph 7. Conditions used are 1 rotation and no weight on the arms. The reference of the abrasive wheel is CS17. In these conditions, the ratio, in percentage, of the surface of the masking agent and the coating film which are removed by the wheels from the surface of the substrate to the total surface swept by the wheels (RW) is preferably comprised between 25% and 100%, more preferably comprised between 50% and 100%, most preferably comprised between 70% and 100%, for example, 74% or 98% depending on the nature of the masking agent. Such values for the ratio RW may ensure that the masking agent covered by the coating film is removed easily without traces. The ratio is measured, for example, by image treatment by a computer of a photograph of the sample.

After the coating film has been deposited, the masking agent which is covered by the coating film may be removed from the substrate, so as to provide a portion of the substrate substantially free of the coating film.

In some embodiments, the masking agent which is covered by the coating film may be removed mechanically, for example by brushing, or by the application of a fluid consisting essentially of water applied as a liquid on the substrate, or be decomposed by heating or by applying UV light. Removal by application of water is preferred, for example, when the masking agent comprises inert solid particles.

The removal of the masking agent may be achieved by hand after the coating has been applied over the substrate or may be automated and included in the process of manufacture of the coated substrate. In the latter case, the masking agent will preferably be removed by the application of water through one or more nozzles which may be located at a distance of less than 35 cm, preferably at a distance of about 25 cm from the substrate. The water may be applied in one or more steps, for example between one and five steps, preferably in three steps, at the same or different pressures for the one or more steps, the pressure being preferably lower than 120 bars, more preferably lower than 50 bars, most preferably lower than 25 bars. Values of pressure may be, for example, between 1, 5, 10, 15, 20, 30, 60 and 100 bars.

The substrate may undergo a pre-wetting treatment, before its removal by application of water, in which a film of water is formed at the surface of the substrate. The pre-wetting treatment is preferably performed at atmospheric pressure. After the pre-wetting treatment, water may be applied at a pressure of, for example, 10 bars in order to remove the majority of the masking agent covered by the coating film. Water may subsequently be applied at a pressure of, for example, 25 bars in order to remove remaining traces of the masking agent.

The substrate may be rinsed by application of water and subsequently dried with hot pulsed air, preferably at a temperature lower than 100° C.

The water applied may be tap water, demineralised water, purified water or water containing one or more additives. The temperature of the water may be comprised between 10° C. and 100° C., preferably between 15° C. and 65° C.

The invention also relates to a substrate comprising a masking agent over part but not the whole surface of the substrate and a coating film deposited over at least part of the substrate which is covered by the masking agent characterised in that the masking agent is removable with water.

In a preferred embodiment of the present invention, the coating film comprises at least one metallic infra-red reflective layer. In one particular embodiment of the invention, the coating film comprises a sequence of layer as follows: dielectric layer/silver/dielectric layer/silver/dielectric layer. The dielectric layers may comprise, for example, tin oxide, zinc oxide, silicon nitride, titanium oxide, aluminium oxide or mixtures of one or more thereof.

In all methods described, the substrate may be glass, for example a sheet of flat glass, particularly a sheet of flat glass intended for subsequent use as or incorporated in an architectural or vehicle glazing panel. It may undergo a thermal toughening treatment or a bending treatment before or after the coating film has been deposited onto at least part of its surface. Alternatively, the substrate may be a rigid or flexible plastics sheet material which may equally be intended for subsequent use as or incorporated in an architectural or vehicle glazing panel. For example, the substrate may be a PET or other plastics sheet material adapted to receive a coating layer and to be laminated or otherwise incorporated in a glazing panel intended for subsequent use as or incorporated in an architectural or vehicle glazing pane.

The non-coated portions of the substrate may be located at the periphery of the substrate. In the case of a windscreen, for example, this may reduce the likelihood of corrosion of the coating by ingress of moisture. Non-coated portions may also provide electrical isolation between the edge of the substrate and the coating layer if the windscreen's coating layer is electrically heatable and provide a portion at which electrical connectors may be arranged. Non-coated portions of the substrate may also be used as data transmission window, i.e. a portion of the surface area of the substrate adapted to permit electromagnetic data transmission there through.

In a further aspect, the present invention relates to a substrate. This substrate may be obtained directly after the deposition of the coating film and before removal of the masking agent.

In another aspect, the present invention relates to the use of a masking agent.

In yet another aspect, the present invention relates to a glazing. Traces of masking agent, substantially invisible to the naked eye, may be detectable on a glazing manufactured by any one of the methods described in the present invention. These traces may occur when the masking agent over coated by the coating film is not completely removed from the surface of the sheet of glass after application, for example, of water, rinsing and subsequent drying of the sheet of glass. These traces may be detected by surface analysis techniques, for example Tof-SIMS.

DETAILED DESCRIPTION

We illustrate the present invention by means of the following examples which should not be considered as a limitation to the present invention.

EXAMPLES

Example 1

An enamel which comprises 60% of frit and 40% of medium is prepared. The frit is composed of 51.3% of $SiO_2$, 21.6% of $B_2O_3$, 9.1% $Al_2O_3$, 5.7% $ZrO_2$, 4.2% $Na_2O$, 1.5% $TiO_2$, 1.4% ZnO, 1.3% F, 0.8% $K_2O$, 0.8% BaO, 0.7% CaO, 0.4% $Fe_2O_3$, 0.2% $P_2O_5$ and 0.02% Pb expressed in percentage by weight compared to the total weight of frit. The medium is essentially dipropyleneglycol.

Figure 1:
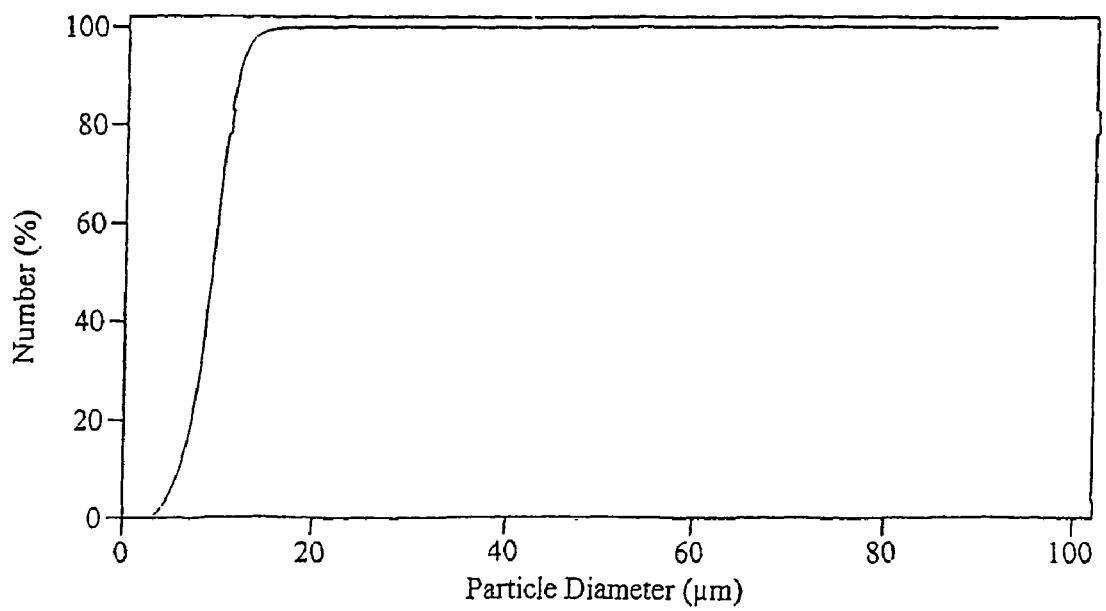
FIG. 1 is a cumulative number size diagram of particles of a masking agent according to the present invention.
Figure 2:
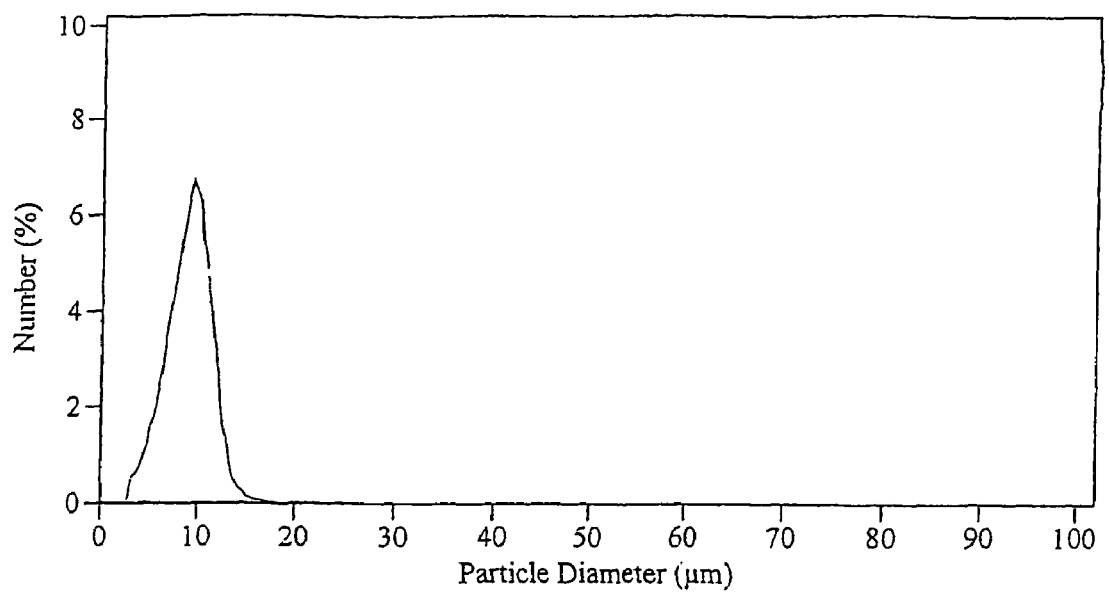
FIG. 2 is a differential of FIG. 1, i.e frequency of particles of a masking agent according to the present invention.

FIG. 1 expresses the percentage in number of the particles of the solid phase of the masking agent, in this case the enamel, as a function of the particle diameter of the solid phase i.e. cumulative number size diagram. It may be obtained by measuring the diameter of each particle of a sample of the solid phase of the enamel from which the medium has been substantially evaporated with a COULTER MULTISIZER instrument. FIG. 2 is a differential of FIG. 1. The mean number diameter of the particles of the solid phase of the enamel may be measured by adding the value obtained for the diameter of each particle and dividing by the total number of particles. A value of 8.8 µm has been found in this case. 94% of the particles. of the solid phase of the enamel have a diameter comprised between 4.8 µm and 12.8 µm, i.e. within −4 µm and +4 µm of 8.8 µm.

The enamel has a viscosity of 35,000 mPa.s and is screen-printed through a 95 threads per centimetre mesh over part of a rectangular glass sheet placed on a conveyor to form a band about 30 mm wide which is intended to form a peripheral band of a windscreen which will subsequently be cut from the rectangular glass sheet. The thickness of the layer of the enamel is approximately 25 µm. The glass sheet is subsequently passed through a heating station at an oven temperature of 165° C. for 30 seconds and subsequently remains on the conveyor at this level of temperature for 90 seconds. The glass sheet is then conveyed to a coater, where a coating stack formed from a sequence of layers is deposited by magnetron vacuum sputtering in the form dielectric/barrier/dielectric/barrier/dielectric. The substrate is pre-washed by application of water at a temperature of about 15° C. during at least 5 seconds and is further conveyed under one ramp equipped with nozzles which are placed at a distance of 25 cm from the substrate. Application of water is achieved through these nozzles at a pressure of 10 bars, followed by application at a pressure of 25 bars from nozzles at a subsequent ramp. The masking agent covered by the coating film is thereby totally removed. The substrate is rinsed with water and dried.

In order to test the adherence to the substrate of the enamel which is covered with the coating film, a 10×10 cm sample of the substrate is cut out and 1 rotation of the abrasion test described in standard ISO/DIS 3537 paragraph 7 is achieved with no weight on the arms and abrasive wheel of ref CS17. The ratio of the surface of the masking agent and the coating film which are removed by the wheels from the surface of the substrate to the total surface swept by the wheels is of about 74%.

Example 2

Example 2 is similar to example 1 except that the frit has the following composition: 65.5% of $SiO_2$, 16.0% of $B_2O_3$, 5.7% $Al_2O_3$, 4.5% $ZrO_2$, 3.0% $Na_2O$, 1.6% $TiO_2$, 1.2% ZnO, 0.9% $K_2O$, 0.5% BaO, 0.5% CaO and 0.3% $Fe_2O_3$ expressed in percentage by weight compared to the total weight of frit.

Examples 3-8 of Table I illustrate other types of masking agents, as well as their characteristics, which may be used in a similar process. The solvent or the medium in these examples is essentially dipropyleneglycol and is present as 44% by total weight of masking agent before it is applied to the substrate. In examples 4, 6 and 8 the masking agent is applied by filmography as a 50 µm liquid film. For examples 3, 5 and 7 a 95 threads per centimetre screen is used.

TABLE I

| Ex. | Solid phase | Mean number diameter (µm) | Viscosity (mPa · s) | Method of application of masking agent | (2) | RW (%) |
|---|---|---|---|---|---|---|
| 3 | Glass powder | 6.8 | (1) | Screen-printing | 83 | 99.8 |
| 4 | Glass powder | 6.8 | 2200 | Film | 83 | 98.0 |
| 5 | microbeads | 9.5 | (1) | Screen-printing | 50 | 96.0 |
| 6 | microbeads | 9.5 | 300 | Film | 50 | (3) |
| 7 | $CaCO_3$ | 14.9 | (1) | Screen-printing | 79.5 | 93.4 |
| 8 | $CaCO_3$ | 14.9 | (1) | Film | 79.5 | 88.5 |

(1) not measured
(2) Percentage in number of particles of the solid phase of the masking agent having a diameter within −4 µm and +4 µm of the mean number diameter
(3) Not measurable

The invention claimed is:

1. A method of forming a coating film at part of a surface of a substrate comprising in sequence the steps of:
   i) applying a masking agent comprising inert enamel solid particles over part but not the whole surface of the substrate by passing the masking agent through a screen which has certain areas which are blocked to provide a pattern,
   ii) depositing under at least partial vacuum the coating film over at least part of the surface of the substrate which is covered by the masking agent and over at least part of the surface of the substrate which is free of the masking agent,
   iii) removing the masking agent which is covered by the coating film from the substrate by application of a fluid comprising water, so as to provide a portion of the substrate substantially free of the coating film.

2. A method according to claim 1 in which the fluid consists essentially of water applied as a liquid.

3. A method according to claim 1 in which the masking agent comprises a substance selected from the group consisting of alcohol solvents, aromatic solvents, aliphatic solvents, water and combinations of two or more of these substances.

4. A method according to claim 1 in which the masking agent has a viscosity comprised between 25,000 and 40,000 mPa.s.

5. A method according to claim 1 in which the fluid is applied at a pressure of less than 120 bars.

6. A method according to claim 1 in which the masking agent is dried at a temperature comprised between 10° C. and 200° C. before applying the coating film.

7. A method according to claim 1 in which the coating film is a solar-control coating film.

8. A method according to claim 1 in which the substrate is a sheet of glass.

9. A method according to claim 1 in which the portion of the substrate substantially free of the coating is a peripheral portion of the substrate.

10. A method according to claim 1 in which the portion of the substrate substantially free of the coating is a data transmission window.

11. A method of forming a coating film at part of a surface of a substrate comprising in sequence the steps of:
   i) applying a masking agent comprising a substance selected from the group consisting of one or more of (a) enamels, (b) inert solids, (c) glass and (d) particles of the solid phase of the masking agent of which at least 50% in number have a diameter which is within $-4\ \mu m$ and $4\ \mu m$ of the mean number diameter of said particles and in which the masking agent has a viscosity comprised between 25,000 and 40,000 mPa,s;
   ii) depositing under at least partial vacuum the coating film over at least part of the surface of the substrate which is covered by the masking agent and over at least part of the surface of the substrate which is free of the masking agent, and
   iii) removing the masking agent which is covered by the coating film from the substrate, so as to provide a portion of the substrate substantially free of the coating film.

12. A method according to claim 11 in which the masking agent is removed by application of a fluid comprising water.

13. A method according to claim 11 in which the masking agent comprises particles of glass.

14. A method according to claim 11 in which the masking agent comprises said particles of the solid phase of the masking agent.

15. A method according to claim 11 in which the masking agent comprises a substance selected from the group consisting of alcohol solvents, aromatic solvents, aliphatic solvents, water and combinations of two or more of these substances.

16. A method according to claim 11 in which the masking agent is applied to the substrate by passing it through a screen which has certain areas which are blocked to provide a pattern.

17. A method according to claim 11 in which the masking agent comprises enamel.

18. A method according to claim 11 in which the coating film is a solar control coating film.

19. A method according to claim 11 in which the substrate is a sheet of glass.

20. A method according to claim 11 in which the portion of the substrate substantially free of the coating is a peripheral portion of the substrate.

21. A method according to claim 11 in which the portion of the substrate substantially free of the coating is a data transmission window.

* * * * *